(12) United States Patent
List et al.

(10) Patent No.: US 11,814,158 B1
(45) Date of Patent: Nov. 14, 2023

(54) SYSTEMS AND METHODS FOR DETERMINING AREAS OF DISCREPANCY IN FLIGHT FOR AN ELECTRIC AIRCRAFT

(71) Applicant: BETA AIR, LLC, South Burlington, VT (US)

(72) Inventors: Alexander Hoekje List, South Burlington, VT (US); Vincent Moeykens, Williston, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/732,294

(22) Filed: Apr. 28, 2022

(51) Int. Cl.
*B64C 19/00* (2006.01)

(52) U.S. Cl.
CPC ..................... *B64C 19/00* (2013.01)

(58) Field of Classification Search
CPC ...................................................... B64C 19/00
See application file for complete search history.

(56) References Cited

U.S. PATENT DOCUMENTS

| | | | |
|---|---|---|---|
| 9,558,601 B2* | 1/2017 | Lu | B64F 5/60 |
| 9,613,539 B1* | 4/2017 | Lindskog | G08G 5/0069 |
| 10,248,742 B2 | 4/2019 | Desell et al. | |
| 10,764,196 B2 | 9/2020 | Downey et al. | |
| 10,832,581 B2 | 11/2020 | Westervelt et al. | |
| 10,992,697 B2 | 4/2021 | Keller et al. | |
| 11,094,146 B1 | 8/2021 | Mash | |
| 2017/0212529 A1 | 7/2017 | Kumar et al. | |

(Continued)

FOREIGN PATENT DOCUMENTS

| CN | 107211287 A | * | 9/2017 | ........... B64C 11/001 |
|---|---|---|---|---|
| EP | 3659910 B1 | * | 12/2021 | ........... B64C 13/044 |

(Continued)

OTHER PUBLICATIONS

Nanduri, Anvardh, et al., Anomaly Detection in Aircraft Data Using Recurrent Neural Networks (RNN), IEEE, Center for Air Transportation Systems Research (CATSR) at George Mason University (GMU), Fairfax, Virginia (2016) (Year: 2016).*

(Continued)

*Primary Examiner* — Jean Paul Cass
(74) *Attorney, Agent, or Firm* — CALDWELL INTELLECTUAL PROPERTY LAW

(57) ABSTRACT

A system for determining areas of discrepancy in flight for an electric aircraft is presented. The system includes a plurality of sensors, wherein each sensor is communicatively connected to a flight component and configured to detect a measured flight and generate a flight phase datum. The system further includes a computing device communicatively connected to the plurality of sensors, wherein the computing device is configured to determine, by a flight phase machine-learning model, a flight phase discrepancy datum. The computing device is configured to train the flight phase machine-learning using a flight phase training set, wherein the flight phase training set correlates a flight phase to a flight standard and output the flight phase discrepancy datum. The computing device is further configured to identify an anomalous performance phase as a function of the flight phase discrepancy datum and generate a discrepancy response.

12 Claims, 10 Drawing Sheets

(56) References Cited

U.S. PATENT DOCUMENTS

| | | | |
|---|---|---|---|
| 2020/0195678 A1* | 6/2020 | Keller | G07C 5/0808 |
| 2020/0290742 A1* | 9/2020 | Kumar | B64D 27/24 |
| 2020/0302026 A1 | 9/2020 | Restifo et al. | |
| 2020/0327747 A1 | 10/2020 | Yamada et al. | |
| 2021/0241632 A1 | 8/2021 | Mustafic et al. | |

FOREIGN PATENT DOCUMENTS

| | | | | |
|---|---|---|---|---|
| JP | 2019108117 A | * | 7/2019 | G05B 23/0243 |
| WO | 2017162197 | | 9/2017 | |
| WO | 2017162197 A1 | | 9/2017 | |

OTHER PUBLICATIONS

Google Machine Translation of Japanese Patent Pub. No. JP 2019108117 A to Seema that was filed in 2018 (Year: 2018).*

Hodge, Victoria J. ; Hodge, Richard; Alexander, Rob , Deep reinforcement learning for drone navigation using sensor data, Jun. 21, 2020.

* cited by examiner

US 11,814,158 B1

SYSTEMS AND METHODS FOR DETERMINING AREAS OF DISCREPANCY IN FLIGHT FOR AN ELECTRIC AIRCRAFT

FIELD OF THE INVENTION

The present invention generally relates to the field of anomaly detection. In particular, the present invention is directed to systems and methods for determining areas of discrepancy in flight for an electric aircraft.

BACKGROUND

The operation and flight of electric vehicles require complex electrical systems working in tandem to produce momentum and ensure safety. An electric aircraft undergoes various transitions to its flight components. Throughout the duration of a flight, the electric aircraft and its actuators may experience anomalous events which is difficult to isolate for operation analysis and improvements.

SUMMARY OF THE DISCLOSURE

In an aspect, a system for determining areas of discrepancy in flight for an electric aircraft is presented. The system includes a plurality of sensors, wherein each sensor is communicatively connected to a flight component and configured to detect a measured flight and generate a flight phase datum. The system further includes a computing device communicatively connected to the plurality of sensors, wherein the computing device is configured to determine, by a flight phase machine-learning model, a flight phase discrepancy datum. The computing device is configured to train the flight phase machine-learning using a flight phase training set, wherein the flight phase training set correlates a flight phase to a flight standard and output the flight phase discrepancy datum. The computing device is further configured to identify an anomalous performance phase as a function of the flight phase discrepancy datum and generate a discrepancy response.

In another aspect, a method for determining areas of discrepancy in flight for an electric aircraft is presented. The method includes detecting, by a sensor communicatively connected to a flight component, a measured flight datum, generating a flight datum as a function of the measured flight datum, determining, by a computing device communicatively connected to the sensor, a flight phase discrepancy datum, wherein determining the flight phase discrepancy datum includes training a flight phase machine-learning model using a flight phase training set, wherein the flight phase training set correlates a flight phase to a flight standard, and outputting the flight phase discrepancy datum as a function of the flight phase machine-learning model. The method further includes identifying an anomalous performance phase as a function of the flight phase discrepancy datum and generating a discrepancy response as a function of the anomalous performance phase.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1A:
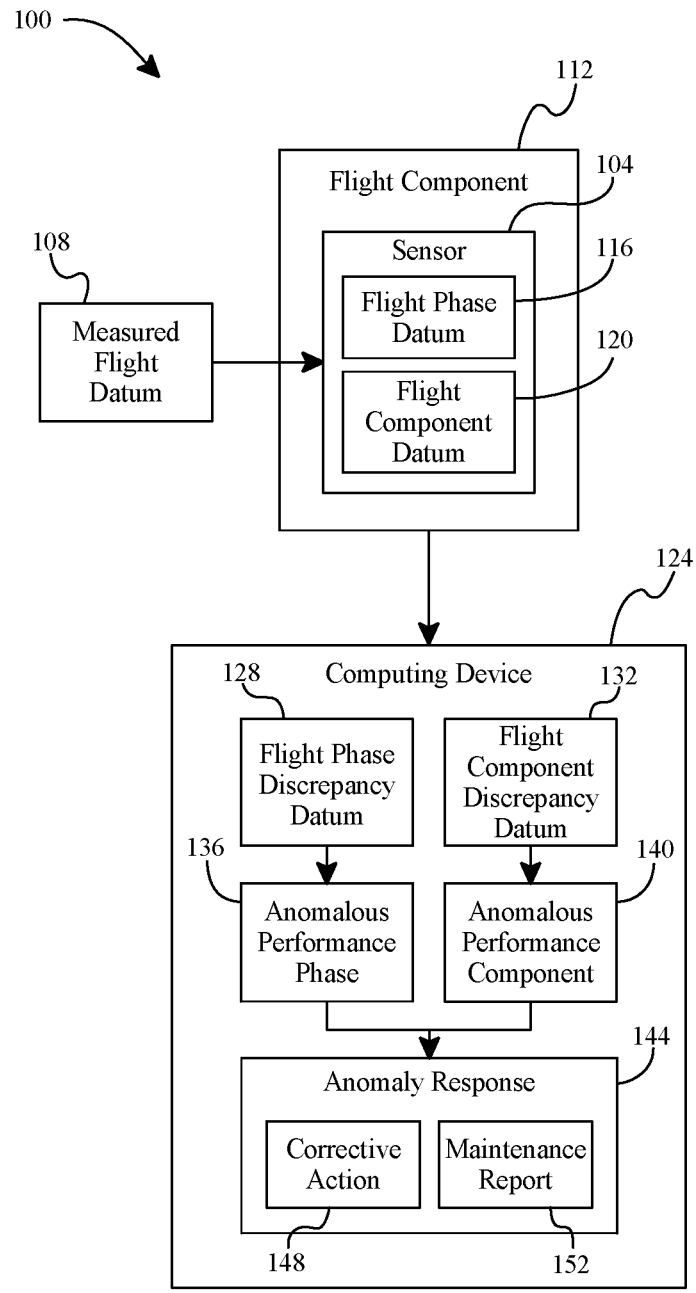
FIG. 1A is a block diagram of an exemplary embodiment of a system for determining areas of discrepancy in flight of an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for determining areas of discrepancy in flight for an electric aircraft. In an embodiment, the electric aircraft may include an electric vertical take-off and landing (eVTOL) aircraft. Aspects of the present disclosure can be used to determine areas of discrepancy prior to flight and/or post flight. In an embodiment, the system may measure performance data of an electric aircraft across various flight phases the electric aircraft undergoes. For example, an electric aircraft may undertake a chronological order of flight phases such as lift off, climb, cruise, descent, hover, landing etc., wherein each phase may require various intensity of electrical systems within the electric aircraft. Within the completion of a flight phase, the intensity of the certain electrical systems may cause some mechanical and/or electrical damage or stress, leading to various sensors disposed onto such electrical systems to detect any anomaly including outlying performance data, lagging communication of signals, unexpected movement, and the like thereof. In some embodiments, the intensity may result in high latency and delayed reception of signals between a flight controller operated by a pilot of an electric aircraft and its associated flight components the pilot intended to maneuver.

Aspects of the present disclosure can be used to measure individual flight components of an electric aircraft throughout a course of a flight to detect for any areas of discrepancy in performance. In an embodiment, a lift motor may fail to output identical torque along with other lift motors, resulting in a tilted angle of attack of the electric aircraft. In another embodiment, a forward pusher of the electric aircraft may fail to output a minimum torque commanded by a pilot due to some mechanical issue in which a sensor may measure the performance data of the forward pusher and identifying the anomaly. In another embodiment, a lift motor may output unexpectedly high torque compared to a maneuver made by a pilot in which a sensor may detect the discrepancy. In some embodiments, the system may find a common discrepancy present throughout a whole flight.

Aspects of the present disclosure can be used to identify an anomaly by searching through a historical record of maintenance performed on an electric aircraft and its flight components to determine if the cause of the anomaly is a maintenance issue. Aspects of the present disclosure can also be used to identify an anomaly by comparing historical performance data of an electric aircraft for each flight phase and/or a historical performance data of each flight component for each flight phase. In an embodiment, a sensor may detect a sudden change in performance data which represents a discrepancy in which a computing device may determine that the discrepancy is a verified anomaly and enable a response and/or action to be undertaken to resolve and/or address the anomaly.

Referring now to FIG. 1A, an exemplary embodiment of a system 100 for determining areas of discrepancy in flight for an electric aircraft is illustrated. System 100 may include a sensor 104 communicatively connected to a flight component 112. A "sensor," for the purposes of this disclosure, is an electronic device configured to detect, capture, measure, or combination thereof, a plurality of external and electric aircraft component quantities. Sensor 104 may include any computing device as described in the entirety of this disclosure and configured to convert and/or translate a plurality of signals detected into electrical signals for further analysis and/or manipulation. In a non-limiting embodiment, sensor 104 may include a plurality of sensors comprised in a sensor suite. For example and without limitation, sensor 104 may include flow sensors, temperature sensors, altimeters, pressure sensors, proximity sensors, airspeed indicators, position sensors, global positioning system (GPS), humidity sensors, level sensors, gas sensors, wireless sensor networks (WSN), compasses, magnetometers, altitude heading and reference systems (AHRSes), tachometers, etc. In a non-limiting embodiment, sensor 104 may be communicatively connected to flight component 112.

As used in this disclosure, "communicatively connected" is defined as a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. Persons skilled in the art, upon reviewing the entirety of this disclosure, will be aware of the various embodiments of controlling a cursor for visual data manipulation for purposes as described herein. Persons skilled in the art, upon reviewing the entirety of this disclosure, will also be aware of the various warning symbols that may be employed to grab the attention of a pilot in the context of simulation consistently described in the entirety of this disclosure.

With continued reference to FIG. 1A, sensor 104 may include a motion sensor. A "motion sensor," for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 104 may include, but not limited to, torque sensor, gyroscope, accelerometer, magnetometer, inertial measurement unit (IMU), pressure sensor, force sensor, proximity sensor, displacement sensor, vibration sensor, and the like. In a non-limiting embodiment, sensor 104 may use of active range finding methods which may include, but not limited to, light detection and ranging (LIDAR), radar, sonar, ultrasonic range finding, forward-looking infrared (FLIR) cameras, enhanced vision systems (EVS), short wave infrared (SWIR) imagers, or the like thereof.

Still referring to FIG. 1A, sensor 104 may be installed onto a plurality of flight instruments of the electric aircraft. As used in this disclosure, a "flight instrument," is defined as an instrument used to provide information involving the flight situation of an electric aircraft it is installed on. In some embodiments, the information of the flight situation may include, but not limited to, altitude, attitude, airspeed, vertical speed, heading, and the like thereof. Sensor 104 installed onto the flight instruments may include an accelerometer, a gyroscope, a torque monitor, tachometers, engine temperature gauges, fuel- and oil-quantity gauges, pressure gauges, altimeters, airspeed-measurement meters, vertical speed indicators and/or combination thereof. In another embodiment, sensor 104 may include radars such as, doppler radars, lightning-detection radars, terrain radars, anti-collision warning systems, stall warning systems, etc. In a non-limiting embodiment, various types of sensor 104 may be used to inform the pilot of the electric aircraft or a user interacting with a remote device in communication with the electric aircraft to take proper action and precaution, and prevent any kind of disaster or accident. Any information captured by sensor 104 may be used for ground testing, flight testing, vibration, environment, angle of attack, static, and the like thereof. Sensor 104 may include a sensor suite which may include a plurality of sensors, wherein the sensors may include any sensor described herein.

Still referring to FIG. 1 may be integrated and/or communicatively connected to at least an actuator and/or flight component, a portion thereof, or any subcomponent thereof of the electric aircraft. An "actuator," as used in this disclosure, is a device configured to produce motion. A "flight component," as used in this disclosure, is a component related to, and mechanically connected to an aircraft that manipulates a fluid medium in order to propel and maneuver the aircraft through the fluid medium. In a non-limiting embodiment, the actuator may be consistent with any flight component as described herein. For example and without limitation, sensor 104 may be disposed onto a plurality of actuators and/or flight components such as, vertical propulsors, forward pushers, motors, electric motors, electric energy source, ailerons, rudders, wings, wing tips, tail, etc. In a non-limiting embodiment, flight components and/or actuators may be any part of an electric aircraft that helps it to achieve physical movements by converting energy, often electrical, air, or hydraulic, into mechanical force and enable movement. "Disposed," for the purpose of this disclosure, is the physical placement of an electrical device on a part of an electric aircraft. Persons skilled in the art, upon reviewing the entirety of this disclosure, will be aware of the various placements of a variety of sensors onto a variety of flight components for capturing data related to the functions of the individual flight components.

With continued reference to FIG. 1A, system 100 may include a plurality of sensors. In a non-limiting embodiment, each sensor may be communicatively connected to a flight component of a plurality of flight components. In some embodiments, a flight component may be communicatively connected to one or more sensors. Sensor 104 may be configured to detect a measured flight datum 108. A "measured flight datum," as used in this disclosure, is one or more signals representing information captured by sensor 104 or any sensor as described in the entirety of this disclosure. In a non-limiting embodiment, measured flight datum 108 may include temperature, voltage, wind resistance, pressure, speed, angles, acceleration, flight speed, flight angle, lag, thrust, lift, and the like thereof. Sensor 104 may also detect a plurality of maneuver data. A "plurality of maneuver data," for the purpose of this disclosure, is any collection of information describing completion by the pilot of procedures and concepts that control the electric aircraft, a simulated electric aircraft, and/or the simulator module. For example and without limitation, the plurality of maneuver data may include foundational flight maneuvers, such as straight-and-level turns, climbs and descents, and/or performance maneuvers, such that the application of flight control pressures, attitudes, airspeeds, and orientations are constantly changing throughout the maneuver. For example and without limitation, the plurality of maneuver data may include, ground reference maneuvers, such as turns around a point, s-turns, rectangular ground maneuvering course, eights along A road, eights around pylons, hover taxi, air taxi, surface taxi, and the like. As a further example and without limitation, the plurality of maneuver data may include takeoffs and landings, such as normal takeoff and climb, crosswind takeoff and climb, short field takeoff and climb, normal takeoff from a hover, vertical takeoff to a hover, short field approach and landing, soft field approach and landing, touch and go, power-off 180 approach and landing, normal approach to a hover, crosswind approach to the surface, and the like. The plurality of maneuver data may further include, for example and without limitation, airborne maneuvers, such as trimming the aircraft, slow flight, lazy eights, chandelle, straight and level flight, turns, steep turns, unusual attitudes, spatial disorientation demonstration, hovering, hovering turn, rapid deceleration, reconnaissance procedures, and the like. The plurality of maneuver data, as a further non-limiting example, may include emergency preparedness, such as steep spirals, emergency approach and landing, spins, ditching, autorotation, vortex ring state, retreating blade stall, ground resonance, dynamic rollover, low rotor RPM, systems malfunction, flight diversions, and the like. Further, the plurality of maneuver data may include, as a non-limiting example, instrument procedures, such as aircraft holding procedures, arcing approach, instrument landing system approach, instrument reference climbs and descents, basic attitude instrument flight, and the like. Persons skilled in the art, upon reviewing the entirety of this disclosure, will be aware of various procedures and concepts that may represent the plurality of maneuver data consistently with this disclosure.

Still referring to FIG. 1A, sensor 104 may be configured to identify a flight phase of the electric aircraft. As described in this disclosure, a "flight phase" is defined as a stage or period within a flight. In a non-limiting embodiment, the electric aircraft may undergo a plurality of different flight phases in the course of a completion of a flight. For example and without limitation, the flight phases may include a planning phase, lift-off/take-off phase, climb phase, cruise phase, descent phase, approach phase, taxi phase, hover phase, landing phase, and the like thereof. In an embodiment, sensor 104 may identify the flight phase of the electric aircraft as a function of the measured aircraft data, such as the plurality of maneuver data. In a non-limiting embodiment, the pilot of the electric aircraft may perform various flight maneuvers that result in the electric aircraft exerting power on various systems and flight components which is detected by sensor 104 and identify the flight phase the electric aircraft is currently in or performing. The pilot may perform the flight maneuvers using one or more pilot controls of the electric aircraft. Aa "pilot control," for the purpose of this disclosure, is an interactive mechanism or means which allows a pilot to control operation of flight components of an electric aircraft. In a non-limiting embodiment, the pilot control may be used by a pilot to manipulate and/or command the components of an electric aircraft. In a non-limiting embodiment, the pilot control may be communicatively connected to sensor 104 and receive a pilot input. A "pilot input" for the purpose of this disclosure, is as any gauge, throttle lever, clutch, dial, control, or any other mechanical or electrical device that is configured to be manipulated by a pilot to receive information. In a non-limiting embodiment, the pilot control may be physically located in the cockpit of the aircraft or remotely located outside of the aircraft in another location communicatively connected to at least a portion of the aircraft. The pilot control may include buttons, switches, or other binary inputs in addition to, or alternatively than digital controls about which a plurality of inputs may be received. In a non-limiting embodiment, the pilot input may include a physical manipulation of a control like a pilot using a hand and arm to push or pull a lever, or a pilot using a finger to manipulate a switch. In another non-limiting embodiment, the pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, or be connected to sensor 104. In some cases, simulator module 120, the physical cockpit, and the pilot control may include sensor 104 and/or be communicatively connected to sensor 104. In a non-limiting embodiment, sensor 104 may be communicatively connected to computing device 112. In some cases, sensor 104 may be configured to detect a user interaction with pilot control. Persons skilled in the art, upon reviewing the entirety of this disclosure, will be aware of the various embodiments and functions of the at least a pilot control for purposes as described herein.

In a non-limiting embodiment, and still referring to FIG. 1A, a pilot input may indicate a pilot's desire to change the heading or trim of an electric aircraft. Pilot input may indicate a pilot's desire to change an aircraft's pitch, roll, yaw, or throttle. In a non-limiting embodiment, an electric aircraft's trajectory may be manipulated by one or more control surfaces and flight components working alone or in tandem consistent with the entirety of this disclosure, hereinbelow. Pitch, roll, and yaw may be used to describe an aircraft's attitude and/or heading, as they correspond to three separate and distinct axes about which the aircraft may rotate with an applied moment, torque, and/or other force applied to at least a portion of an aircraft. "Pitch," for the purposes of this disclosure refers to an aircraft's angle of attack, which is the difference between the aircraft's nose and the horizontal flight trajectory. For example, an aircraft pitches "up" when its nose is angled upward compared to horizontal flight, like in a climb maneuver. In another example, the aircraft pitches "down," when its nose is angled downward compared to horizontal flight, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, which is to say that when an aircraft rotates about its axis from its tail to its nose, and one side rolls upward, like in a banking maneuver. "Yaw," for the purposes of this disclosure, refers to an aircraft's turn angle, when an aircraft rotates about an imaginary vertical axis intersecting the center of the earth and the fuselage of the aircraft. "Throttle," for the purposes of this disclosure, refers to an aircraft outputting an amount of thrust from a propulsor. Pilot input, when referring to throttle, may refer to a pilot's desire to increase or decrease thrust produced by at least a propulsor With continued reference to FIG. 1A, sensor 104 may be configured detect measured state data. A "measured state data," as used in this disclosure, is a datum that is collected via a physical controller area network (CAN) bus unit describing a plurality of functionalities of the electric aircraft. A "physical controller area network bus," as used in this disclosure, is vehicle bus unit including a central processing unit (CPU), a CAN controller, and a transceiver designed to allow devices to communicate with each other's applications without the need of a host computer which is located physically at the electric aircraft. In a non-limiting embodiment, the electric aircraft may include a plurality of physical CAN bus units communicatively connected to the electric aircraft. For instance and without limitation, the physical CAN bus unit may be consistent with the physical CAN bus unit in U.S. patent application Ser. No. 17/218,312 and entitled, "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated by reference herein in its entirety. In a non-limiting embodiment, the measured state data may include a plurality of data signals detailing a control flight component 112 and/or plurality of flight components communicatively connected to the electric aircraft. A measured state data may include a plurality of data entries such as measured flight datum 108, flight phase datum 116, flight component datum 120, and/or data entries relating aircraft pitch, roll, yaw, torque, angular velocity, climb, speed, performance, lift, thrust, drag, battery charge, fuel level, location, and the like. A measured state data may include a plurality of data communicating the status of flight control devices such as proportional-integral-derivative controller, fly-by-wire system functionality, aircraft brakes, impeller, artificial feel devices, stick shaker, power-by-wire systems, active flow control, thrust vectoring, alerion, landing gear, battery pack, propulsor, management components, control surfaces, sensors/sensor suites, creature comforts, inceptor, throttle, collective, cyclic, yaw pedals, MFDs, PFDs, and the like. A measured state data may exist as analogue and/or digital data, originating from physical CAN bus units such as bits, where a series of serial binary data are composed and transmitted relaying a measured state as indicated from a device located within, on, or communicating with the electric aircraft.

With continued reference to FIG. 1A, sensor 104 may be configured to generate a flight phase datum 116 as a function of measured flight datum 108. A "flight phase datum," as used in this disclosure, is any data and/or information involving or describing a flight phase of an electric aircraft and its flight component 112. In a non-limiting embodiment, flight phase datum 116 may be included a sequential listing of flight phase datum wherein the sequential listing includes a series of elements of each flight phase and its data. For instance and without limitation, a sequential listing may include a sequential listing as described herein in U.S. patent application Ser. No. 17/562,082, and entitled, "METHODS AND SYSTEMS FOR AUTHENTICATION OF AN ELECTRIC AIRCRAFT FOR RECHARGING," which is incorporated by reference in its entirety herein. In another non-limiting embodiment, flight phase datum 108 may include a grouping of a plurality of information describing an electric aircraft and its flight component 112 for each flight phase. For example and without limitation, flight phase datum 108 may include a group of information describing the performance of flight component 112 during a lift-off stage. Persons skilled in the art, upon reviewing the entirety of this disclosure, will be aware of the various embodiments of data and/or information describing an electric aircraft and its flight phase.

Still referring to FIG. 1A, sensor 104 may be configured to generate a flight component datum 120 as a function of measured flight datum 108. A "flight component datum," as used in this disclosure, is an element of readable information of the measured aircraft data and/or any data involving or describing the electric aircraft and its flight component 112. In a non-limiting embodiment, flight component datum 120 may be generated as a function of the measured aircraft data and the flight phase of the electric aircraft. Flight component datum 120 may include an element of data describing the physical or environmental parameters of an electric aircraft, flight component 112, and/or an outside environment affecting the electric aircraft and its flight component 112. In a non-limiting embodiment, measured flight datum may include, but not limited to, temperature, wind speed, altitude, flight time, remaining flight time, air pressure, power output, remaining battery capacity, number of cargo and/or personnel, aircraft velocity, aircraft actuator torque output, and the like thereof flight component datum 120 from a pilot, remote user, or one or more of the previous, alone or in combination.

In a non-limiting embodiment, and still referring to FIG. 1A, sensor 104 may detect and/or receive a plurality of signals representing data captured by sensor 104 and translate those signals into computer-readable data. The translated data my include a collection of data to be viewed, analyzed, and/or manipulated by a computing device 112 and/or a user/pilot. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. For example and without limitation, A plurality of datum captured by sensor 104 may include circuitry, computing devices, electronic components or a combination thereof that translates into at least an electronic signal configured to be transmitted to another electronic component. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

In a non-limiting embodiment, and still referring to FIG. 1A, sensor 104 may include a first sensor and a second sensor communicatively connected to flight component 112. In a non-limiting embodiment, a first sensor and a second sensor may be identical. A first sensor may detect a first measured flight datum of flight component 112. The first measured flight datum may be consistent with any measured flight datum as described herein. Then a second sensor may detect a second measured flight datum of flight component 112. The second measured flight datum may be consistent with any measured flight datum. In other words, the second sensor may measure data following the first sensor in order for computing device 124 to determine any major discrepancies between the two measured data. In a non-limiting embodiment, ideally, computing device 124 determines that there is no significant discrepancy between the first measured flight datum and the second measured flight datum. For example and without limitation, the first sensor may detect an electric propulsor speed of 100 miles per hour while the second sensor may detect a propulsor speed of 100.1 miles per hour. First sensor and the Second sensor may perform their respective data detection in different time intervals. In a non-limiting embodiment, first sensor may be configured to detect and/or measure flight data at a first time interval such as every 10 millisecond. Second sensor may be configured to detect and/or measure flight data at a second time interval such as every 10 millisecond with an offset of 1 millisecond after the first sensor. This is so, at least in part, to ensure that the plurality of sensors and/or computing device 124 may easily identify a spike in performance data. In some embodiments, the time intervals may be governed by a timer. A timer may include a timing circuit, internal clock, or other circuit, component, or part configured to keep track of elapsed time and/or time of day. The timer may be configured to govern at which time intervals a sensor and/or a plurality of sensors may measure measured flight datum 108 and generate flight phase datum 116 and/or flight component datum 120. Persons skilled in the art, upon reviewing the entirety of this disclosure, will be aware of the various embodiments of measuring data in the context of identifying discrepancies.

With continued reference to FIG. 1A, system 100 includes a computing device 124. computing device 124 may include any computing device as described in this disclosure, including without limitation a microcontroller, microprocessor, digital signal processor (DSP) and/or system on a chip (SoC) as described in this disclosure. In a non-limiting embodiment, computing device 124 may include a flight controller disposed in an electric aircraft. For example and without limitation, a flight controller enabled to perform all the functions of system 100 from an electric aircraft. Computing device may include, be included in, and/or communicate with a mobile device such as a mobile telephone or smartphone. computing device 124 may include a single computing device operating independently, or may include two or more computing device operating in concert, in parallel, sequentially or the like; two or more computing devices may be included together in a single computing device or in two or more computing devices. computing device 124 may interface or communicate with one or more additional devices as described below in further detail via a network interface device. Network interface device may be utilized for connecting computing device 124 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 124 may include but is not limited to, for example, a computing device or cluster of computing devices in a first location and a second computing device or cluster of computing devices in a second location. computing device 124 may include one or more computing devices dedicated to data storage, security, distribution of traffic for load balancing, and the like. computing device 124 may distribute one or more computing tasks as described below across a plurality of computing devices of computing device, which may operate in parallel, in series, redundantly, or in any other manner used for distribution of tasks or memory between computing devices. computing device 124 may be implemented using a "shared nothing" architecture in which data is cached at the worker, in an embodiment, this may enable scalability of system 100 and/or computing device.

With continued reference to FIG. 1A, computing device 124 may be designed and/or configured to perform any method, method step, or sequence of method steps in any embodiment described in this disclosure, in any order and with any degree of repetition. For instance, computing device 124 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 124 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1A, computing device 124 may be configured to receive flight phase datum 116 and generate a flight phase discrepancy datum 128. A "flight phase discrepancy datum," as used in this disclosure, is an element of information of flight phase datum 116 and/or any data and/or information involving or describing any discrepancy, inconsistency, and/or outliers from a flight phase. In a non-limiting embodiment, flight phase discrepancy datum 128 may include flight phase performance values exceeding and/or receding parameters including flight duration, attitude, altitude, velocity, turbulence, and the like thereof. For example, flight phase discrepancy datum 128 may include flight phase performance values of a cruise phase of an electric aircraft to be an average 300 miles per hour. However, flight phase discrepancy datum 128 may also include flight phase performance values of the electric aircraft flying at 350 miles per hour at one point in the cruise phase, indicating a discrepancy. In some embodiments, the discrepancy may indicate a serious flaw with the electric aircraft and its flight component 112 or may indicate a minor and/or harmless pilot maneuver. Alternatively or additionally, computing device 124 may compare flight phase datum 116 to a flight phase standard which indicates a plurality of ranges indicating appropriate performance data ranges for a plurality of flight phases and/or flight phase performance data. Persons skilled in the art, upon reviewing the entirety of this disclosure, will be aware of the various embodiments of aircraft data for various flight phases and potential discrepancies in performance data as described herein.

With continued reference to FIG. 1A, computing device 124 may be configured to receive flight component datum 120 and generate a flight component discrepancy datum 132. A "flight component discrepancy datum," as used in this disclosure, is a discrepancy in an element of information of and/or concerning a flight component datum and/or any data involving or describing any discrepancy in such information. In a non-limiting embodiment, flight component discrepancy datum 132 may include flight component performance values exceeding and/or receding parameters including torque, power consumption, motor speed, pressure, latency, and the like thereof. For example and without limitation, one of the four propulsors of the electric aircraft may exert a torque amount significantly lower than the remaining three in a lift off flight phase. Based on previous flight component discrepancy datum recorded in aircraft datum database 156, the four propulsors may reveal a general trend of exerting roughly the same amount of torque, Flight component discrepancy datum 132 may represent performance differences among a plurality of similar flight components and/or performance differences from a plurality of previous electric aircraft operations. In some embodiments, discrepancy information of flight component discrepancy datum 132 may be governed by an expected performance value and/or range. For example and without limitation, based on some performance standard and/or a trend from previous flights, flight component discrepancy datum 132 may include flight component information describing any performance value/range deviation that flight component datum 120 reveals. Alternatively or additionally, computing device 124 may compare flight component datum 120 to a flight component standard which indicates a plurality of ranges indicating appropriate performance data ranges for a plurality of flight components and/or flight component performance data Persons skilled in the art, upon reviewing the entirety of this disclosure, will be aware of the various embodiments of performance data for a plurality of flight components of an electric aircraft in the context of identifying a discrepancy.

With continued reference to FIG. 1A, an "anomaly" as used in this disclosure, is an outlying flight component and/or flight phase in which the performance of an electric aircraft significantly exceeds or recedes a certain standard such as a flight phase standard and/or flight component standard. In some embodiments, an anomaly may include a mechanical and/or electrical error with an aircraft and its flight component 112. In another embodiment, an anomaly may be the result of an unexpected flight maneuver and/or unexpected energy output by flight component that is not indicative of any major threats. Persons skilled in the art, upon reviewing the entirety of this disclosure, will be aware of the various embodiments of an anomaly for purposes as described herein.

Still referring to FIG. 1A, computing device 124 may be configured to identify an anomalous performance phase 136 as a function of flight phase discrepancy datum 128. An "anomalous performance phase," as used in this disclosure, is a flight phase of an electric aircraft in which an anomaly is present. For example and without limitation, anomalous performance phase 136 may include a lift-off phase in which this phase displayed some anomalous performance. For example and without limitation, during the lift-off phase, one of four lift motors of an electric aircraft may be operating unusually compared to the other three in which the speed of the lift motor is lagging behind that of the other three lift motors. This discrepancy may be identified by sensor 104 and represented in flight phase discrepancy datum 128. In some cases, anomalous performance phase 136 may include a minor discrepancy that is not indicative of a major electrical and/or mechanical fault. In some cases, anomalous performance phase 136 may display performance data that is indicative of a significant electrical and/or mechanical fault.

In a non-limiting embodiment, and still referring to FIG. 1A, computing device 124 may be configured to identify an anomalous performance component 140. An "anomalous performance component," as used in this disclosure, is a flight component of an electric aircraft in which an anomaly is present. In a non-limiting embodiment, anomalous performance component 140 may include flight component 112. For example and without limitation, anomalous performance component 140 may include a propulsor. An electric aircraft may experience an unexpected shift in angle of attack in which computing device 124 may identify the cause of it to be the propulsor in which the anomaly is present. Persons skilled in the art, upon reviewing the entirety of this disclosure, will be aware of the various embodiments of performance of a flight component indicative of an anomaly for purposes as described herein.

With continued reference to FIG. 1A, computing device 124 may be configured to generate an anomaly response 144. An "anomaly response," as used in this disclosure, is a security measure used to resolve, eliminate, and/or contain the cause of the anomaly. In a non-limiting embodiment, the cause of the anomaly may include any fight component as described herein. In some cases, anomaly response 144 may include no response as computing device 124 may determine that the anomaly is not urgent, significant, and/or detrimental. In some embodiments, computing device 124 may be configured to generate and/or perform anomaly response 144 midflight, such as a corrective action. In a non-limiting embodiment, anomaly response 144 may include a corrective action. A "corrective action" as used in this disclosure, is an action conducted by an electric aircraft and/or a plurality of flight components to correct and/or alter a movement of the electric aircraft and/or the plurality of flight components to resolve the anomaly. For instance and without limitation, the corrective action may be consistent with the corrective action in U.S. patent application Ser. No. 17/474,435, and entitled, "SYSTEM AND METHOD FOR IMPACT DETECTION CAPABILITIES," which is incorporated by reference herein in its entirety. In an embodiment, and without limitation, a corrective action may include a strike force command. As used in this disclosure a "strike force command" is a command and/or signal to flight component 112 that reduces a strike force, wherein a strike force is an amount of force that is induced as a function of lift component striking and/or interacting with the extraneous object. For example, and without limitation, strike force command may include a command that signals one or more propellers to rotate and/or operate at a reduced speed and/or velocity such that a strike force is reduced. In another embodiment, and without limitation, a corrective action may include a reverse torque command. As used in this disclosure a "reverse torque command" is a command directing flight component 112 to reduce and/or reverse a first torque magnitude and/or direction. As a non-limiting example, reverse torque command may command a propeller that has a first torque of 9 Nm in a clockwise direction to reduce the torque to 2 Nm in the same clockwise direction. As a further non-limiting example, reverse torque command may command a rotor that has a first torque of 7 Nm in a clockwise direction to reverse the torque direction to counterclockwise with a torque of 3 Nm.

In an embodiment and still referring to FIG. 1A, reverse torque command may include a reverse thrust command. As used in this disclosure a "reverse thrust command" is a command directing a lift component to reduce and/or reverse a first thrust. In an embodiment reverse thrust command may be configured to generate a thrust in an opposite direction to a forward thrust direction. As used in this disclosure a "forward thrust direction" is a first direction of thrust that propels aircraft in a forward direction as a function of a lift component. For example, and without limitation, forward thrust direction may include a longitudinal direction directed towards the nose of electric aircraft. In an embodiment, and without limitation, reverse thrust command may include a command that directs a propulsor with a first thrust of 90 N in a forward direction to reverse thrust towards a backward direction with a thrust of 20 N. In another embodiment, and without limitation, reverse thrust command may be transmitted to at least a power source, wherein a power source is described above. For example, and without limitation, reverse thrust command may be transmitted to at least a motor that is rotating in a first clockwise direction, wherein the motor is adjusted to rotate in a second counterclockwise direction.

Still referring to FIG. 1A, identifying a corrective action may include inducing an aerodynamic drag. As used in this disclosure an "aerodynamic drag" is a force acting opposite to the relative motion of aircraft. For example, and without limitation, aerodynamic drag may include an air resistance, friction, fluid resistance, and the like thereof. In an embodiment aerodynamic drag may be relative for a velocity. For example, and without limitation, aerodynamic drag may increase proportional to the velocity for laminar flow. As a further non-limiting example, aerodynamic drag may increase proportional the squared velocity for turbulent flow. As a further non-limiting example, aerodynamic drag may include one or more parasitic drags, such as form drag, skin friction drag, and the like thereof, lift-induced drag, wave drag, wave resistance, and the like thereof. In an embodiment, and without limitation, inducing aerodynamic drag may include moving flight component 112 into a reverse thrust mode. As used in this disclosure a "reverse thrust mode" is a mode and/or setting denoting that a flight component is producing a reverse thrust. For example, and without limitation, reverse thrust mode may include a rotor that is producing a reverse thrust. As a further non-limiting example, reverse thrust mode may include a propeller that is operating in reverse thrust. In an embodiment, inducing aerodynamic drag may include recuperating aerodynamic energy. As used in this disclosure an "aerodynamic energy" is an energy and/or source of power that is generated as a function of aerodynamics. For example, and without limitation, aerodynamic energy may include energy produced as a function charging a battery as a result of aerodynamics. In an embodiment recuperating aerodynamic energy may include reaching a reverse thrust level. As used in this disclosure a reverse thrust level is maximum level of aerodynamic energy that may be recuperated before operating conditions of aircraft become unsafe. For example, and without limitation, reverse thrust level may identify that a maximum of 13 kJ of aerodynamic energy may be recuperated prior to the aircraft operating unsafely. As a further non-limiting example, reverse thrust level may identify that a maximum of 6 kJ of aerodynamic energy may be recuperated prior to the aircraft operating unsafely. Additionally or alternatively, corrective action may include any corrective action as described in U.S. Nonprovisional application Ser. No. 17/222,539, filed on Apr. 5, 2021, and entitled "AIRCRAFT FOR SELF-NEUTRALIZING FLIGHT," the entirety of which is incorporated herein by reference.

With continued reference to FIG. 1A, anomaly response 144 may include a maintenance report 152. A "maintenance report," as used in this disclosure, is a record of maintenances to be scheduled for an electric aircraft to address the flight component in which an anomaly is present. In some embodiments, maintenance report 152 may include various operation information such as any information describing the maintenance, repair, and overhaul of the electric aircraft or an electric aircraft's flight components. This may include a record of maintenance activities and their results including a plurality of tests, measurements, replacements, adjustments, repairs, and the like, which may be intended to retain and/or restore a functional unit of an electric aircraft. plurality of measured aircraft operation datum may include a record of data of, but not limited to, functional checks, servicing, repairing or replacing of necessary devices, equipment, machinery, and the like, pertaining to the electric aircraft. In a non-limiting embodiment, maintenance report 152 may include historical records, information, and/or identifiers of electric aircraft and its components relating to maintenance, repairs, schedules, and the like thereof. For example and without limitation, maintenance report 152 may include a unique identification number denoting a part of the electric aircraft that was installed, repaired, or replaced as a function of an aircraft maintenance. A person of ordinary skill in the art, after viewing the entirety of this disclosure, would appreciate the various elements of data pertaining to a record of data in the context of maintenance and repair.

Figure 1B:
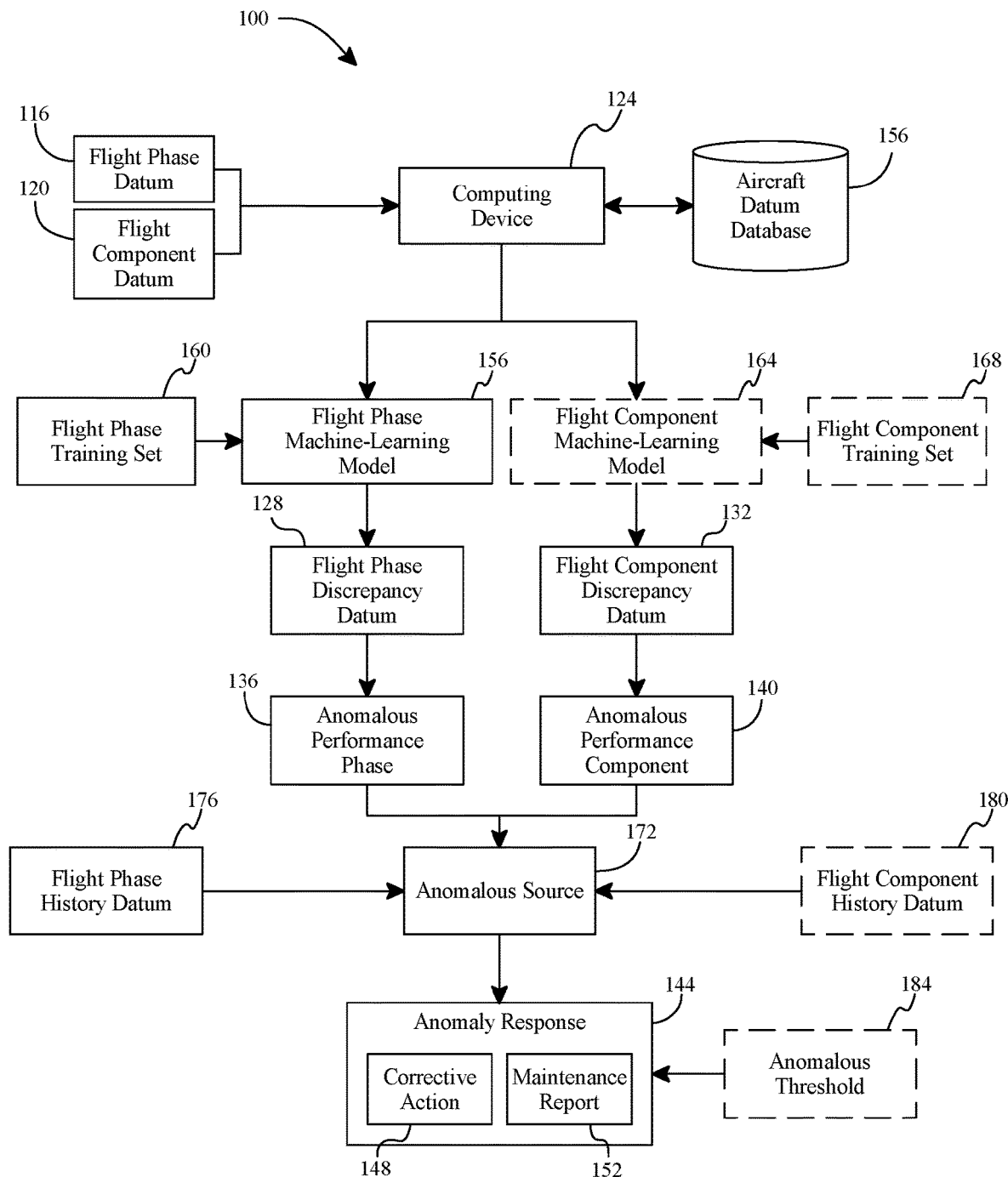
FIG. 1B is a block diagram of another exemplary embodiment of a system for determining areas of discrepancy in flight of an electric aircraft.

Referring now to FIG. 1B, a block diagram of another exemplary embodiment of a system 100 for determining areas of discrepancy in flight of an electric aircraft is illustrated. In a non-limiting embodiment, flight phase discrepancy datum 128 may be generated by a flight phase machine-learning model 156. A "flight phase machine-learning model," as used in this disclosure, is any machine-learning model, process, and/or algorithm used to output flight phase discrepancy datum 128. In a non-limiting embodiment, computing device 124 may use flight phase datum 116 as an input for flight phase machine-learning model 156. Computing device 124 may train flight phase machine-learning model 156 using a flight phase training set 160. A "flight phase training set," as used in this disclosure, is a training set and/or data correlating a flight phase to a flight phase standard. A "flight phase standard," as used in this disclosure, is a flight phase performance index used for computing device 124 to compare the severity of discrepancy the flight phase and/or flight phase datum 116 reveals. For example and without limitation, a flight phase may include a hover phase in which the hover phase is assigned a flight phase standard of a hover altitude of 15 feet. Another non-limiting example may include a cruise phase in which the cruise phase is assigned a flight phase standard of a cruise speed of 200 miles per hour. In some embodiments, flight phase training set 160 may be retrieved from aircraft datum database 156. An "aircraft datum database," as used in this disclosure, is a data storage system used to store a historical record of flight phase datums and/or flight component datums. In a non-limiting embodiment, aircraft datum database 15 may store electric aircraft information such as maintenance reports and the like thereof. Flight phase machine-learning model 156 may output flight phase discrepancy datum 128 as a function of flight phase training set 160. Alternatively or additionally, a remote device may train flight phase machine-learning model 156 using flight phase training set 160 to generate flight phase discrepancy datum 128. The remoted device may include any computing device as described herein. For example and without limitation, the remote device may receive the necessary information such as flight phase datum 116 as an input to train flight phase machine-learning model 156. The remote device may be configured to transmit to and/or receive from computing device 124, for instance in the form of coefficients, weights, biases and/or other tuned and/or tunable parameters, and instantiated. Computing device 124 may transmit any datum collected by any sensors to the remote device for complex data analysis and receive flight phase discrepancy datum 128 from the remote device.

Still referring to FIG. 1B, flight component discrepancy datum 132 may be generated as a function of a flight component machine-learning model 164. A "flight component machine-learning model," as used in this disclosure, is any machine-learning model, process, and/or algorithm used to output flight component discrepancy datum 132. Computing device 124 may receive flight component datum 120 as an input for flight component machine-learning model 164. Computing device 124 may then train flight component machine-learning model 164 using a flight component training set 168. A "flight component training set," as used in this disclosure, is an element of flight component data correlated to a flight component standard. In some embodiments, flight component training set 168 may be retrieved from aircraft datum database 156. A "flight component standard," as used in this distinct in this disclosure is a flight component performance index used for computing device 124 to compare the severity of discrepancy the flight component and/or flight component datum 120 reveals. For example and without limitation, a propulsor may be assigned a flight component standard of 300 miles per hour cruise speed. Flight component machine-learning model 164 may output flight component discrepancy datum 132 as a function of flight component training set 168. Alternatively or additionally, a remote device may train flight component machine-learning model 164 using flight component training set 168 to generate flight component discrepancy datum 132. The remoted device may include any computing device as described herein. For example and without limitation, the remote device may receive the necessary information such as flight component datum 120 as an input to train flight component machine-learning model 164. The remote device may be configured to transmit to and/or receive from computing device 124, for instance in the form of coefficients, weights, biases and/or other tuned and/or tunable parameters, and instantiated. Computing device 124 may transmit any datum collected by any sensors to the remote device for complex data analysis and receive flight component discrepancy datum 132 from the remote device.

With continued reference to FIG. 1B, computing device 124 may be configured to identify an anomalous source 172. An "anomalous source," as used in this disclosure, is a pinpointed combination of anomalous performance phase 136 and anomalous performance component 140 for which an anomaly response 144 may be acted upon. In some embodiments, anomalous source 172 may include a forward pusher in the flight phase. For example and without limitation, a forward pusher of electric aircraft may show no signs of significant and/or threatening performance data, however, it may represent an anomaly only in the cruise phase of a flight. Persons skilled in the art, upon reviewing the entirety of this disclosure, will be aware of the various embodiments of an anomalous source in the context of specific flight components at specific flight phases.

Still referring to FIG. 1B, computing device 124 may identify anomalous source 172 as a function of a comparison of flight phase history datum 176 and/or flight component history datum 180. A "flight phase history datum," as used in this disclosure, is a historical record of flight phase performances for electric aircraft and/or a standard of flight phase performances. In some embodiments flight phase history datum 176 may include a flight phase performance index for computing device to compare flight phase discrepancy datum 128 and/or anomalous performance phase 136 to. For example and without limitation, the ascending phase of an electric aircraft may display performance data discrepancies compared to that of a history of flight phase performances of the ascending phase such as a longer ascending duration. A "flight component history datum," as used in this disclosure, is a historical record of flight component performances for electric aircraft and/or a standard of flight component performances. In some embodiments flight component history datum 180 may include a flight phase performance index for computing device to compare flight component discrepancy datum 132 and/or anomalous performance component 140 to. For example and without limitation, a propulsor may reach a maximum speed of 300 miles per hour throughout the duration of a flight of an electric aircraft based on historical records and/or previous flights, while flight component datum 120 reveals that the maximum speed the propulsor reached was 250 miles per hour, indicating a discrepancy. Persons skilled in the art, upon reviewing the entirety of this disclosure, will be aware of the various embodiments of comparing historical data in the context of identifying an anomaly and/or its source.

With continued reference to FIG. 1B, computing device 124 may generate anomaly response 144 as a function of an anomalous threshold 184. An "anomalous threshold," as used in this disclosure, is a value indicating the severity of an anomaly response. In some embodiments, anomalous threshold 184 may include fuzzy sets with upper and lower bounds wherein the center indicates a safe zone in which no major action is required, while the outer bounds represent severe cases in which a prioritized response and/or immediate attention is required. Persons skilled in the art, upon reviewing the entirety of this disclosure, will be aware of the various embodiments of using a threshold in the context of generating a response.

Figure 2:
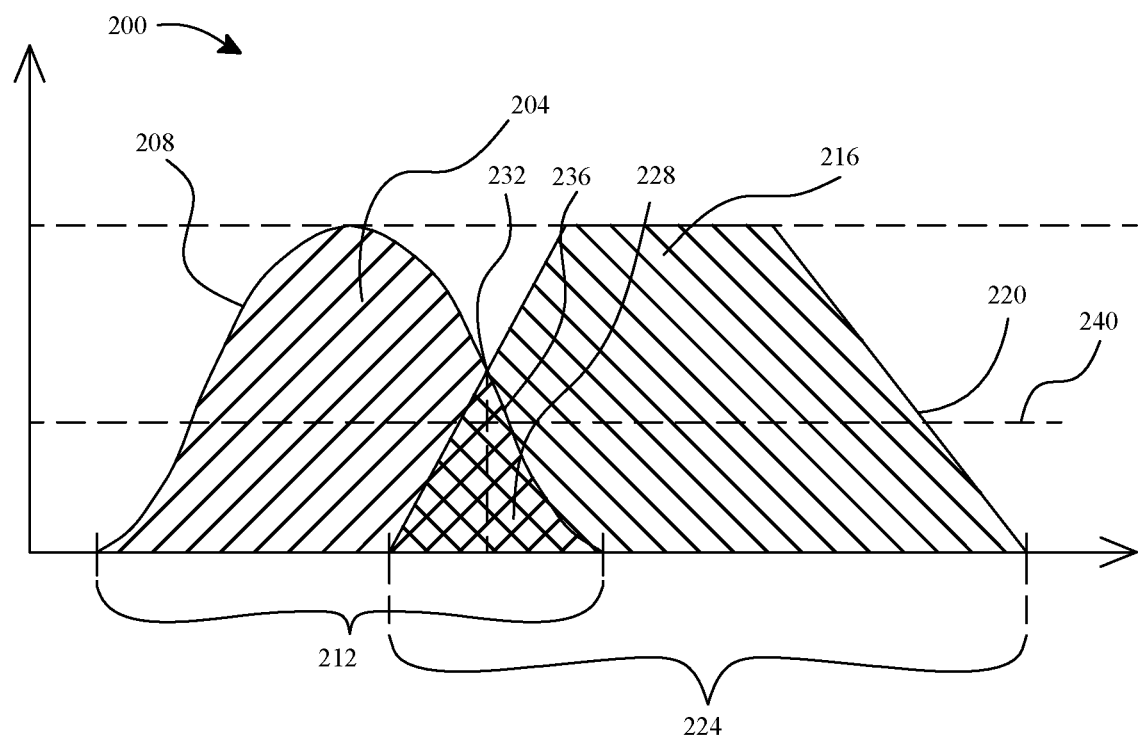
FIG. 2 is an illustration of exemplary embodiments of fuzzy sets.

Now referring to FIG. 2, an illustration of exemplary embodiments of fuzzy sets. In a non-limiting embodiment, an outlying threshold may be represented as fuzzy sets. A first fuzzy set 204 may be represented, without limitation, according to a first membership function 208 representing a probability that an input falling on a first range of values 212 is a member of the first fuzzy set 204, where the first membership function 208 has values on a range of probabilities such as without limitation the interval [0,1], and an area beneath the first membership function 208 may represent a set of values within first fuzzy set 204. Although first range of values 212 is illustrated for clarity in this exemplary depiction as a range on a single number line or axis, first range of values 212 may be defined on two or more dimensions, representing, for instance, a Cartesian product between a plurality of ranges, curves, axes, spaces, dimensions, or the like. First membership function 208 may include any suitable function mapping first range 212 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 204 may represent any value or combination of values as described above, including predictive prevalence value, probabilistic outcome, any resource datum, any niche datum, and/or any combination of the above. A second fuzzy set 216, which may represent any value which may be represented by first fuzzy set 204, may be defined by a second membership function 220 on a second range 224; second range 224 may be identical and/or overlap with first range 212 and/or may be combined with first range via Cartesian product or the like to generate a mapping permitting evaluation overlap of first fuzzy set 204 and second fuzzy set 216. Where first fuzzy set 204 and second fuzzy set 216 have a region 328 that overlaps, first membership function 208 and second membership function 220 may intersect at a point 232 representing a probability, as defined on probability interval, of a match between first fuzzy set 204 and second fuzzy set 216. Alternatively or additionally, a single value of first and/or second fuzzy set may be located at a locus 236 on first range 212 and/or second range 224, where a probability of membership may be taken by evaluation of first membership function 208 and/or second membership function 220 at that range point. A probability at 228 and/or 232 may be compared to a threshold 240 to determine whether a positive match is indicated. Threshold 240 may, in a non-limiting example, represent a degree of match between first fuzzy set 204 and second fuzzy set 216, and/or single values therein with each other or with either set, which is sufficient for purposes of the matching process; for instance, the outlying threshold may indicate a sufficient degree of overlap between a maximum limit for a performance parameter and minimum limit for a performance parameter in which performance data outside those limits warrants an immediate and/or prioritized anomaly response.

Figure 3:
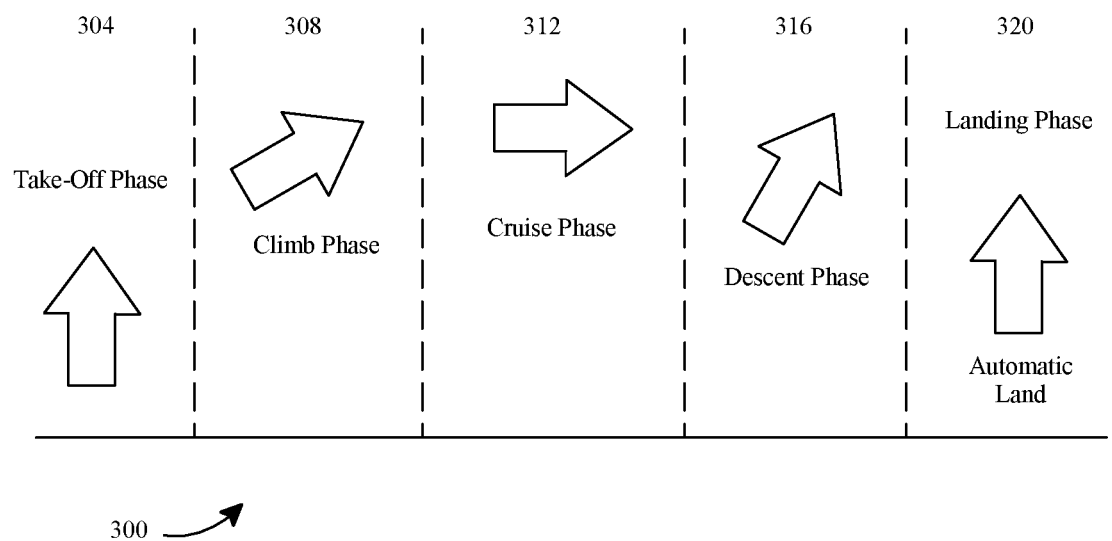
FIG. 3 is an illustration of an exemplary embodiment of a plurality of flight phases of an electric aircraft

Referring now to FIG. 3, an illustration of exemplary embodiment of a plurality of flight phases 300 of an electric aircraft is illustrated. For instance and without limitation, the plurality of flight phases and the events related to each flight phase may be consistently described in U.S. patent application Ser. No. 17/562,090, and entitled, "SYSTEMS AND METHODS FOR SCALING LAG BASED ON FLIGHT PHASE OF AN ELECTRIC AIRCRAFT," which is incorporated by reference herein in entirety. The plurality of flight phases are illustrated with arrows wherein the direction the arrow is pointing depicts the positioning of vertical propulsors of the electric aircraft as described in the entirety of this disclosure. Take-off phase 304 is illustrated wherein the phase includes lifting off from the ground and hovering. The electric aircraft may transition to climb phase 308 from take-off phase 304. In climb phase 308, the operating power of electric systems, actuators, flight components, etc. of the electric aircraft may be increased significantly to produce greater lift, acceleration, and forward movement. The electric aircraft may transition from climb phase 308 to cruise phase 312, in which cruise phase 312 may result in greater time delay for data transfer. The electric aircraft may transition from cruise phase 312 to descent phase 316. The electric aircraft may transition to the final stage such as landing phase 320. Similar to take-off phase 304. In a non-limiting embodiment, the computing device of the electric aircraft and/or sensors may recognize the current flight phase the electric aircraft is in and detect measured flight datum for each phase.

Figure 4:
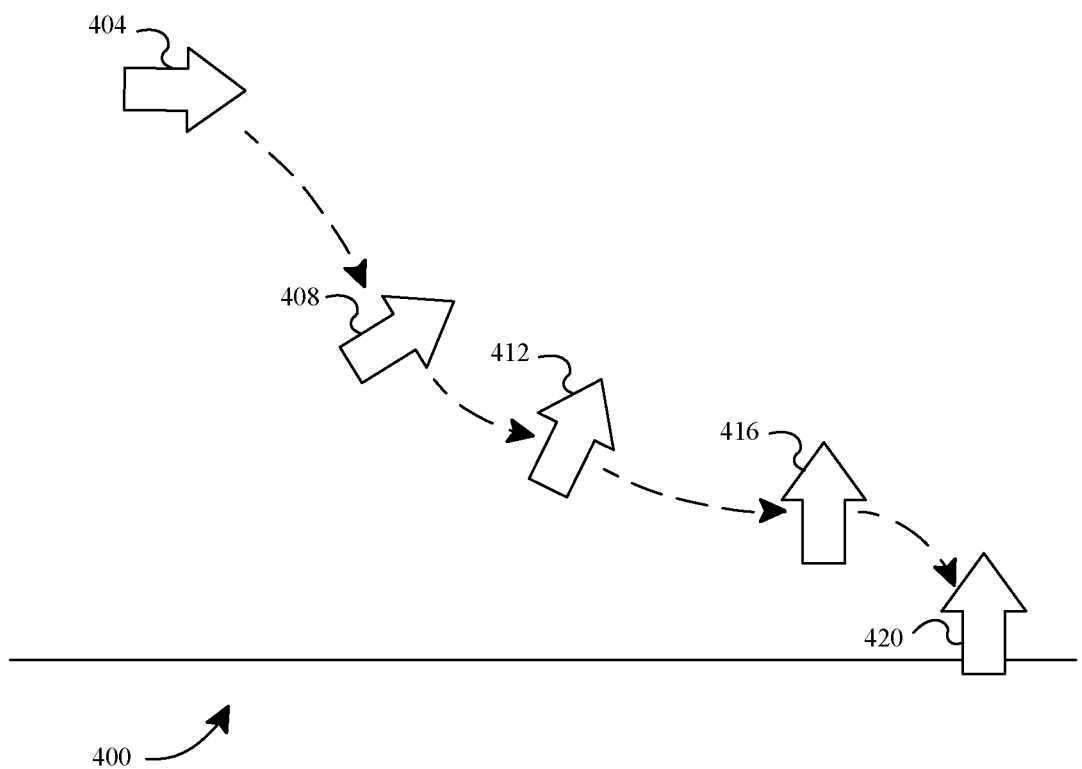
FIG. 4 is an illustration of an exemplary embodiment of an enactment of wing positioning of an aircraft transitioning from fixed wing flight vertical wing flight for landing.

Now referring to FIG. 4, an illustration of an exemplary embodiment of an enactment 400 of wing positioning of an aircraft transitioning from fixed wing to flight vertical wing flight for landing. In position 404 descent has not started. For instance and without limitation, the enactment of wing position of an aircraft transitioning from fixed wing flight to vertical wing flight may be consistently described in U.S. patent application Ser. No. 17/480,231, and is entitled, "SYSTEMS AND METHODS FOR FIXED WING FLIGHT TO VERTICAL WING FLIGHT FOR LANDING FOR AN AIRCRAFT," which is incorporated by reference herein in its entirety. In position 404, the forward propulsor are producing an increased amount of torque in forward flight while the vertical propulsors are outputting a minimal amount of torque to maintain a constant altitude and a low angle of attack. In a non-limiting embodiment, the beginning stage of descent may be triggered based on a pilot input. A computing device and/or flight controller may determine when to begin descent based on a target landing location. A computing device and/or flight controller may instruct the aircraft to maintain a dive or initial descent position for the majority of the landing approach. Prior to descent, the vertical propulsors of an aircraft may be in a neutral position. In the beginning stage of descent, the computing device and/or flight controller may instruct vertical propulsors to decrease their torque output. As descent begins, the vertical propulsors begin to decrease its torque output to reduce the altitude and approach a landing location in position 408. In a non-limiting embodiment, a front pair of vertical propulsors that are coupled closer to the front of the aircraft may output significantly more torque than the pair of vertical propulsors to achieve a high angle of attack. In a non-limiting embodiment, forward propulsors may still output torque in a decreasing amount to provide some lift to the aircraft as it slowly descends to the landing location. The combination of wing and rotor lift with some forward speed may be able to support the vehicle down to a low landing speed. Below the low landing speed, gravity may cause the aircraft to fall towards ground. The aircraft may apply a large amount of power to slow the aircraft as it falls, allowing the aircraft to slowly accelerate towards the ground in an arc. The trajectory of speed, control inputs, and altitude may be optimized to allow the aircraft to touch down accurately in a planned position. As initial descent begins, the vertical propulsors are increasing its torque output to reduce the descent speed of the aircraft in position 412. In a non-limiting embodiment, forward propulsor may be increasing its rate of decrease in torque output in position 412. The nose of the aircraft may be sharply angled away from ground. The aircraft may be in a full upwards tilt position, e.g. tilted as far as the aircraft controls or actuators allow. The trajectory of the aircraft may allow it to slow down before touching down. The surface of the wings may provide drag that aids in slowing the aircraft. The rotors vertical propulsors be powered at maximum power, pulling the aircraft backwards and away from ground. When a power surge is applied to slow down the aircraft, the vertical propulsors are each outputting the same amount of torque to maintain an upright position in position 416. In a non-limiting embodiment, forward propulsors may be acting on a minimum to adjust the direction of the aircraft to the landing location. In position 420, the aircraft has achieved and completed its final stage of descent. In a non-limiting embodiment, the forward propulsor may be turned off and the vertical propulsors may still be operating to slowly land on the landing location. In a non-limiting embodiment, in position 420, in a final stage of descent, the aircraft may be incapable of generating enough lift to counteract gravity. The aircraft may generate an amount of lift that helps slow the descent of the aircraft. Wings of the aircraft may be stalled while also producing a lift factor that slows down the aircraft. The wings may produce attached lift. The aircraft may set down as the attached lift dies out. In the final stage of descent, abortion of the final stage of descent may be impossible. In some embodiments, the aircraft has a thrust to weight ratio of 1 or greater before the final stage of descent. The aircraft may have a thrust to weight ratio of less than 1 but substantially close to 1 (e.g. 0.9) during the final stage of descent.

Figure 5:
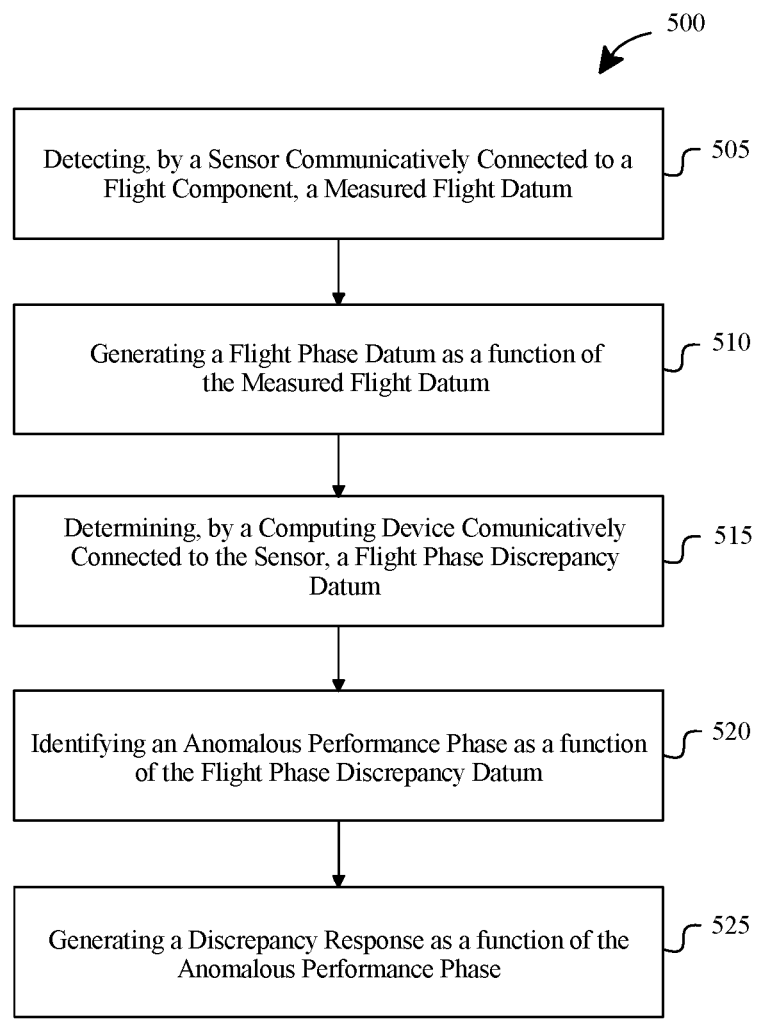
FIG. 5 is a flow diagram of an exemplary embodiment of a method for determining areas of discrepancy in flight for an electric aircraft.

Referring now to FIG. 5, a flow diagram of an exemplary embodiment of a method 500 for determining areas of discrepancy in flight for an electric aircraft is illustrated. The electric aircraft may include any electric aircraft as described herein. Method 500, at step 505, may include detecting, by a sensor communicatively connected to a flight component, a measured flight datum. The sensor may include any sensor as described herein. The flight component may include any flight component as described herein. The measured flight datum may include any measured flight datum as described herein. In a non-limiting embodiment, method 500 may include detecting, by a first sensor communicatively connected to the flight component, a first measured flight datum at a first time interval and detecting, by a second sensor communicatively connected to the flight component, a second measured flight datum at a second time interval. The first sensor may include any sensor as described herein. The second sensor may include any sensor as described herein. The first measured flight datum may include any first measured flight datum as described herein. The second measured flight datum may include any second measured flight datum as described herein. The first time interval may include any first time interval as described herein. The second time interval may include any second time interval as described herein. In a non-limiting embodiment, method 500 may include the second sensor detecting the second measured flight datum of a flight component 10 milliseconds after the first sensor detecting the first measured flight datum of the same flight component. Persons skilled in the art, upon reviewing the entirety of this disclosure, will be aware of the various methods of detecting and measuring data in the context of detecting any anomalies.

Still referring to FIG. 5, method 500, at step 510, may include generating a flight phase datum as a function of the measured flight datum. The flight phase datum may include any flight phase datum as described herein. In a non-limiting embodiment, method 500 may include generating a flight component datum as a function of the measured flight datum. In some embodiments, the flight component datum may be incorporated in the flight phase datum. Persons skilled in the art, upon reviewing the entirety of this disclosure, will be aware of the various methods of generating any datum from measured data for purposes as described herein.

Still referring to FIG. 5, method 500, at step 515, may include determining, by a computing device communicatively connected to the sensor, a flight phase discrepancy datum. The computing device may include any computing device as described herein. The flight phase discrepancy datum may include any flight phase discrepancy datum as described herein. In a non-limiting embodiment, method 500 may include training, by a computing device, a flight phase machine-learning model using a flight phase training set, wherein the flight phase training set correlates a flight phase to a flight standard and outputting the flight phase discrepancy datum as a function of the flight phase machine-learning model. The flight phase machine-learning model may include any flight phase machine-learning model as described herein. The flight phase training set may include any flight phase training set as described herein. In a non-limiting embodiment, method 500 may include retrieving the flight phase training set from an aircraft datum database. The aircraft datum database may include any aircraft datum database as described herein. Persons skilled in the art, upon reviewing the entirety of this disclosure, will be aware of the various methods of generating a datum containing discrepancy information in the context of machine-learning.

In a non-limiting embodiment, and still referring to FIG. 5, method 500 may include determining, by a computing device, a flight component discrepancy datum as a function of the flight component datum. The flight component discrepancy datum may include any flight component discrepancy datum as described herein. In another non-limiting embodiment, method 500 may include generating the flight component discrepancy datum as a function of a flight component machine-learning model. The flight component machine-learning model may include any flight component machine-learning as described herein. Method 500 may include receiving, by the flight component machine-learning model, the flight component datum as an input. Method 500 may include training the flight component machine-learning model using a flight component training set. The flight component training set may include any flight component training set as described herein. Method 500 may include outputting, by the flight component machine-learning model, the flight component discrepancy datum as a function of the flight component training set.

With continued reference to FIG. 5, method 500, at step 520, may include identifying an anomalous performance phase as a function of the flight phase discrepancy datum. The anomalous performance phase may include any anomalous performance phase as described herein. In a non-limiting embodiment, method 500 may include identifying an anomalous performance component as a function of the flight component discrepancy datum. The anomalous performance component may include any anomalous performance component as described herein. In a non-limiting embodiment, method 500 may further include identifying an anomalous source. The anomalous source may include any anomalous source as described herein. In a non-limiting embodiment, identifying the anomalous source may include combining the anomalous performance phase and the anomalous performance component and identify which component at which phase and/or which phase with which component an anomaly is present in. In a non-limiting embodiment, method 500 may include identifying the anomalous source by comparing the flight phase discrepancy datum and a flight phase history datum retrieved from the aircraft datum database. The flight phase history datum may include any flight phase history datum as described herein. In another non-limiting embodiment, the anomalous source may further be identified by comparing the flight component discrepancy datum and a flight component history datum retrieved from the aircraft datum database. The flight component history datum any flight component history datum as described herein.

Still referring to FIG. 5, method 500, at step 525, may include generating an anomaly response as a function of the anomalous performance phase. The anomaly response may include any anomaly response as described herein. In a non-limiting embodiment, method 500 may include generating the anomaly response as a function of the anomalous performance component. The anomalous performance component may include any anomalous performance component as described herein. Alternatively or additionally the anomaly response may be generated as a function of the anomalous source. In a non-limiting embodiment, generating the anomaly response may include generating the anomaly response comprises a corrective action. The corrective action may include any corrective action as described herein. In a non-limiting embodiment, generating the anomaly response may include generating a maintenance report. The maintenance report may include any maintenance report as described herein. Alternatively or additionally, method 500 may include generating the anomaly response as function of an anomalous threshold. The anomalous threshold may include any anomalous threshold as described herein. Persons skilled in the art, upon reviewing the entirety of this disclosure, will be aware of the various methods of generating and performing a response due to an anomalous event.

Figure 6:
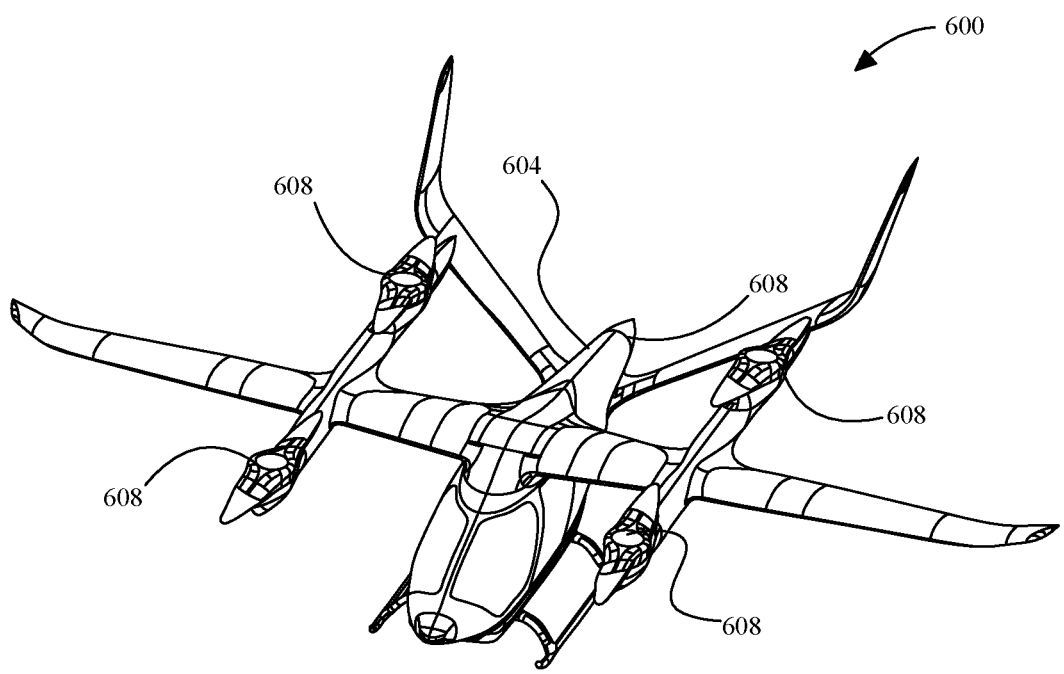
FIG. 6 is an illustration of an exemplary embodiment of an electric aircraft.

Referring now to FIG. 6, an exemplary embodiment of an electric aircraft 600 is illustrated. Electric aircraft 600 may be consistent with aircraft 104. In an embodiment, electric aircraft 600 is an electric aircraft. As used in this disclosure an "aircraft" is any vehicle that may fly by gaining support from the air. In some embodiments, electric aircraft 600 is manned by a pilot seated inside electric aircraft 600. In a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Electric aircraft 600 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, and titled "AN INTEGRATED ELECTRIC PROPULSION ASSEMBLY," the entirety of which is incorporated herein by reference.

With continued reference to FIG. 6, as used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel electric aircraft 600, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight," as described herein, is where the aircraft is capable of flight using wings and/or foils that generate lift caused by the aircraft's forward airspeed and the shape of the wings and/or foils, such as airplane-style flight.

Still referring to FIG. 6, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 604 may include structural elements that physically support a shape and structure of an aircraft. Structural elements may take a plurality of forms, alone or in combination with other types. Structural elements may vary depending on a construction type of aircraft such as without limitation a fuselage 604. Fuselage 604 may include a truss structure. A truss structure may be used with a lightweight aircraft and includes welded steel tube trusses. A "truss," as used in this disclosure, is an assembly of beams that create a rigid structure, often in combinations of triangles to create three-dimensional shapes. A truss structure may alternatively include wood construction in place of steel tubes, or a combination thereof. In embodiments, structural elements may include steel tubes and/or wood beams. In an embodiment, and without limitation, structural elements may include an aircraft skin. Aircraft skin may be layered over the body shape constructed by trusses. Aircraft skin may include a plurality of materials such as plywood sheets, aluminum, fiberglass, and/or carbon fiber, the latter of which will be addressed in greater detail later herein.

In embodiments, and with continued reference to FIG. 6, aircraft fuselage 604 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 604 orthogonal to a longitudinal (nose to tail) axis of the aircraft and may form a general shape of fuselage 604. A former may include differing cross-sectional shapes at differing locations along fuselage 604, as the former is the structural element that informs the overall shape of a fuselage 604 curvature. In embodiments, aircraft skin may be anchored to formers and strings such that the outer mold line of a volume encapsulated by formers and stringers includes the same shape as electric aircraft 600 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

Still referring to FIG. 6, electric aircraft 600 may include a plurality of flight components 608. As used in this disclosure a "flight component" is a component that promotes flight and guidance of an aircraft. In an embodiment, flight component 608 may be mechanically coupled to an aircraft. Plurality of flight components 608 may include flight component 108. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 6, plurality of flight components 608 may include at least a landing gear. The landing gear may be consistent with any landing gear as described in the entirety of this disclosure. In another embodiment, plurality of flight components 608 may include at least a propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis.

In an embodiment, and still referring to FIG. 6, plurality of flight components 608 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may include a square wave, sine wave, modified sine wave, near sine wave, and the like thereof.

Still referring to FIG. 6, plurality of flight components 608 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1045 N to force aircraft to in a horizontal direction along the longitudinal axis. As a further non-limiting example, pusher component may twist and/or rotate to pull air behind it and, at the same time, push electric aircraft 600 forward with an equal amount of force. In an embodiment, and without limitation, the more air forced behind aircraft, the greater the thrust force with which electric aircraft 600 is pushed horizontally will be. In another embodiment, and without limitation, forward thrust may force electric aircraft 600 through the medium of relative air. Additionally or alternatively, plurality of flight components 608 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Figure 7:
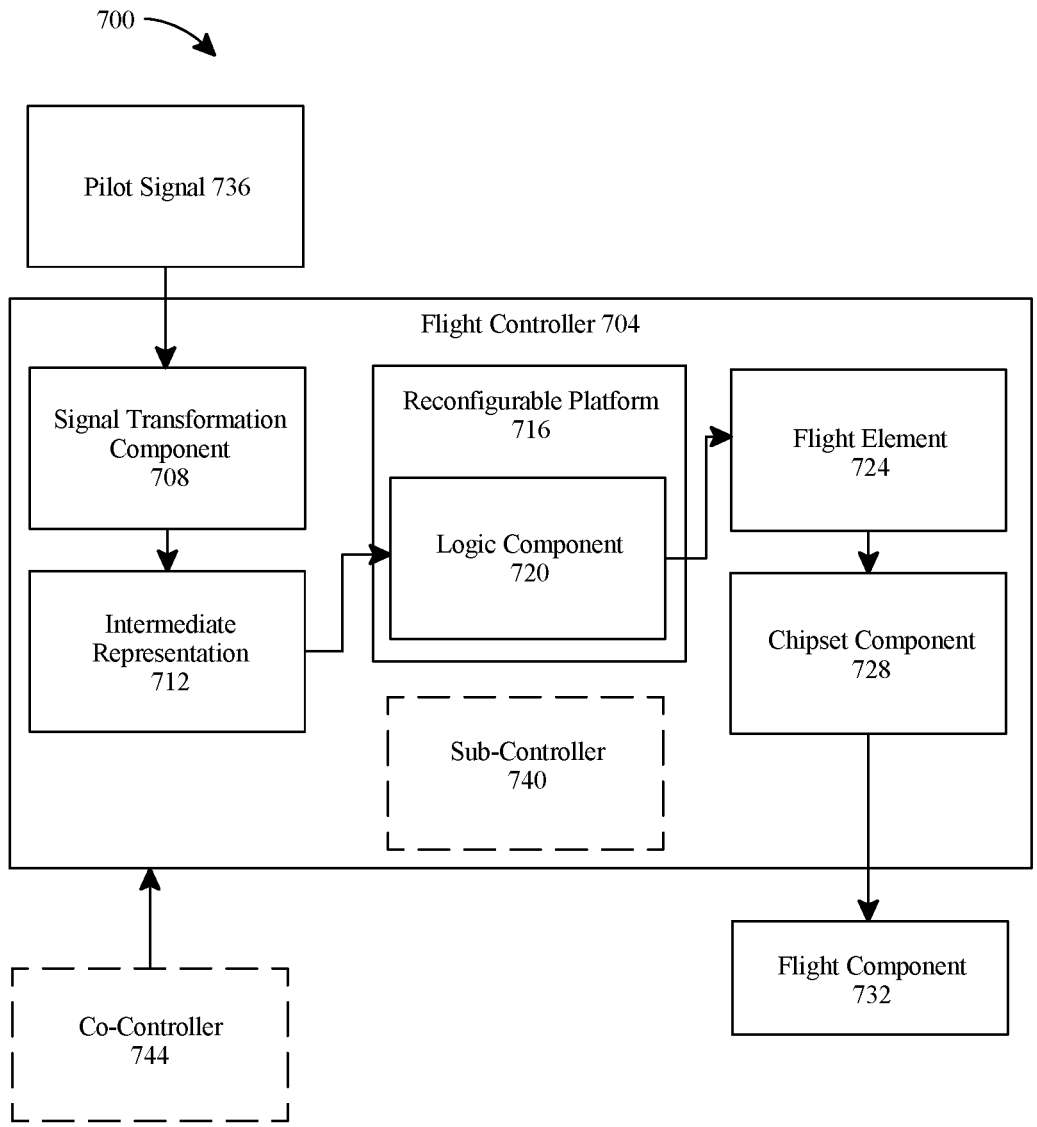
FIG. 7 is a block diagram of an exemplary embodiment of a flight controller.

Now referring to FIG. 7, an exemplary embodiment 700 of a flight controller 704 is illustrated. Flight controller 704 may be consistent with any flight controller 116 as described herein. As used in this disclosure a "flight controller" is a computing device of a plurality of computing devices dedicated to data storage, security, distribution of traffic for load balancing, and flight instruction. Flight controller 704 may include and/or communicate with any computing device as described in this disclosure, including without limitation a microcontroller, microprocessor, digital signal processor (DSP) and/or system on a chip (SoC) as described in this disclosure. Further, flight controller 704 may include a single computing device operating independently, or may include two or more computing device operating in concert, in parallel, sequentially or the like; two or more computing devices may be included together in a single computing device or in two or more computing devices. In a non-limiting embodiment, system 70 may include a computing device wherein the computing device may include flight controller 704 configured to facilitate communication between a plurality of aircrafts and their flight controllers. In embodiments, flight controller 704 may be installed in an aircraft, may control the aircraft remotely, and/or may include an element installed in the aircraft and a remote element in communication therewith. In some embodiments, flight controller 704 may be configured to generate a node as described in FIG. 1.

In an embodiment, and still referring to FIG. 7, flight controller 704 may include a signal transformation component 708. As used in this disclosure a "signal transformation component" is a component that transforms and/or converts a first signal to a second signal, wherein a signal may include one or more digital and/or analog signals. For example, and without limitation, signal transformation component 708 may be configured to perform one or more operations such as preprocessing, lexical analysis, parsing, semantic analysis, and the like thereof. In an embodiment, and without limitation, signal transformation component 708 may include one or more analog-to-digital convertors that transform a first signal of an analog signal to a second signal of a digital signal. For example, and without limitation, an analog-to-digital converter may convert an analog input signal to a 7-bit binary digital representation of that signal. In another embodiment, signal transformation component 708 may include transforming one or more low-level languages such as, but not limited to, machine languages and/or assembly languages. For example, and without limitation, signal transformation component 708 may include transforming a binary language signal to an assembly language signal. In an embodiment, and without limitation, signal transformation component 708 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 7, signal transformation component 708 may be configured to optimize an intermediate representation 712. As used in this disclosure an "intermediate representation" is a data structure and/or code that represents the input signal. Signal transformation component 708 may optimize intermediate representation as a function of a data-flow analysis, dependence analysis, alias analysis, pointer analysis, escape analysis, and the like thereof. In an embodiment, and without limitation, signal transformation component 708 may optimize intermediate representation 712 as a function of one or more inline expansions, dead code eliminations, constant propagation, loop transformations, and/or automatic parallelization functions. In another embodiment, signal transformation component 708 may optimize intermediate representation as a function of a machine dependent optimization such as a peephole optimization, wherein a peephole optimization may rewrite short sequences of code into more efficient sequences of code. Signal transformation component 708 may optimize intermediate representation to generate an output language, wherein an "output language," as used herein, is the native machine language of flight controller 704. For example, and without limitation, native machine language may include one or more binary and/or numerical languages.

In an embodiment, and still referring to FIG. 7, flight controller 704 may include a reconfigurable hardware platform 716. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 716 may be reconfigured to enact any algorithm and/or algorithm selection process received from another computing device and/or created using machine-learning processes.

Still referring to FIG. 7, reconfigurable hardware platform 716 may include a logic component 720. As used in this disclosure a "logic component" is a component that executes instructions on output language. For example, and without limitation, logic component may perform basic arithmetic, logic, controlling, input/output operations, and the like thereof. Logic component 720 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 720 may be organized according to Von Neumann and/or Harvard architecture as a non-limiting example. Logic component 720 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 720 may include one or more integrated circuit microprocessors, which may contain one or more central processing units, central processors, and/or main processors, on a single metal-oxide-semiconductor chip. Logic component 720 may be configured to execute a sequence of stored instructions to be performed on the output language and/or intermediate representation 712. Logic component 720 may be configured to fetch and/or retrieve the instruction from a memory cache, wherein a "memory cache," as used in this disclosure, is a stored instruction set on flight controller 704. Logic component 720 may be configured to decode the instruction retrieved from the memory cache to opcodes and/or operands. Logic component 720 may be configured to execute the instruction on intermediate representation 712 and/or output language. For example, and without limitation, logic component 720 may be configured to execute an addition operation on intermediate representation 712 and/or output language.

In an embodiment, and without limitation, logic component 720 may be configured to calculate a flight element 724. As used in this disclosure a "flight element" is an element of datum denoting a relative status of aircraft. For example, and without limitation, flight element 724 may denote one or more torques, thrusts, airspeed velocities, forces, altitudes, groundspeed velocities, directions during flight, directions facing, forces, orientations, and the like thereof. For example, and without limitation, flight element 724 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 724 may denote that aircraft is following a flight path accurately and/or sufficiently.

In an embodiment, and still referring to FIG. 7, flight controller 704 may be configured generate an autonomous function. As used in this disclosure an "autonomous function" is a mode and/or function of flight controller 704 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 724. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 704 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 704 will control the ailerons and/or rudders. As used in this disclosure "non-autonomous mode" is a mode that denotes a pilot will control aircraft and/or maneuvers of aircraft in its entirety.

In an embodiment, and still referring to FIG. 7, flight controller 704 may generate autonomous function as a function of an autonomous machine-learning model. As used in this disclosure an "autonomous machine-learning model" is a machine-learning model to produce an autonomous function output given flight element 724 and a pilot signal 736 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 736 may denote that a pilot is controlling and/or maneuvering ailerons, wherein the pilot is not in control of the rudders and/or propulsors. In an embodiment, pilot signal 736 may include an implicit signal and/or an explicit signal. For example, and without limitation, pilot signal 736 may include an explicit signal, wherein the pilot explicitly states there is a lack of control and/or desire for autonomous function. As a further non-limiting example, pilot signal 736 may include an explicit signal directing flight controller 704 to control and/or maintain a portion of aircraft, a portion of the flight plan, the entire aircraft, and/or the entire flight plan. As a further non-limiting example, pilot signal 736 may include an implicit signal, wherein flight controller 704 detects a lack of control such as by a malfunction, torque alteration, flight path deviation, and the like thereof. In an embodiment, and without limitation, pilot signal 736 may include one or more explicit signals to reduce torque, and/or one or more implicit signals that torque may be reduced due to reduction of airspeed velocity. In an embodiment, and without limitation, pilot signal 736 may include one or more local and/or global signals. For example, and without limitation, pilot signal 736 may include a local signal that is transmitted by a pilot and/or crew member. As a further non-limiting example, pilot signal 736 may include a global signal that is transmitted by air traffic control and/or one or more remote users that are in communication with the pilot of aircraft. In an embodiment, pilot signal 736 may be received as a function of a tri-state bus and/or multiplexor that denotes an explicit pilot signal should be transmitted prior to any implicit or global pilot signal.

Still referring to FIG. 7, autonomous machine-learning model may include one or more autonomous machine-learning processes such as supervised, unsupervised, or reinforcement machine-learning processes that flight controller 704 and/or a remote device may or may not use in the generation of autonomous function. As used in this disclosure "remote device" is an external device to flight controller 704. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 7, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 704 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 7, flight controller 704 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 704. Remote device and/or FPGA may transmit a signal, bit, datum, or parameter to flight controller 704 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 704 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 7, flight controller 704 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 7, flight controller 704 may include, but is not limited to, for example, a cluster of flight controllers in a first location and a second flight controller or cluster of flight controllers in a second location. Flight controller 704 may include one or more flight controllers dedicated to data storage, security, distribution of traffic for load balancing, and the like. Flight controller 704 may be configured to distribute one or more computing tasks as described below across a plurality of flight controllers, which may operate in parallel, in series, redundantly, or in any other manner used for distribution of tasks or memory between computing devices. For example, and without limitation, flight controller 704 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

Still referring to FIG. 7, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 7, flight controller may include a sub-controller 740. As used in this disclosure a "sub-controller" is a controller and/or component that is part of a distributed controller as described above; for instance, flight controller 704 may be and/or include a distributed flight controller made up of one or more sub-controllers. For example, and without limitation, sub-controller 740 may include any controllers and/or components thereof that are similar to distributed flight controller and/or flight controller as described above. Sub-controller 740 may include any component of any flight controller as described above. Sub-controller 740 may be implemented in any manner suitable for implementation of a flight controller as described above. As a further non-limiting example, sub-controller 740 may include one or more processors, logic components and/or computing devices capable of receiving, processing, and/or transmitting data across the distributed flight controller as described above. As a further non-limiting example, sub-controller 740 may include a controller that receives a signal from a first flight controller and/or first distributed flight controller component and transmits the signal to a plurality of additional sub-controllers and/or flight components.

Still referring to FIG. 7, flight controller may include a co-controller 744. As used in this disclosure a "co-controller" is a controller and/or component that joins flight controller 704 as components and/or nodes of a distributer flight controller as described above. For example, and without limitation, co-controller 744 may include one or more controllers and/or components that are similar to flight controller 704. As a further non-limiting example, co-controller 744 may include any controller and/or component that joins flight controller 704 to distributer flight controller. As a further non-limiting example, co-controller 744 may include one or more processors, logic components and/or computing devices capable of receiving, processing, and/or transmitting data to and/or from flight controller 704 to distributed flight control system. Co-controller 744 may include any component of any flight controller as described above. Co-controller 744 may be implemented in any manner suitable for implementation of a flight controller as described above.

In an embodiment, and with continued reference to FIG. 7, flight controller 704 may be designed and/or configured to perform any method, method step, or sequence of method steps in any embodiment described in this disclosure, in any order and with any degree of repetition. For instance, flight controller 704 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 8:
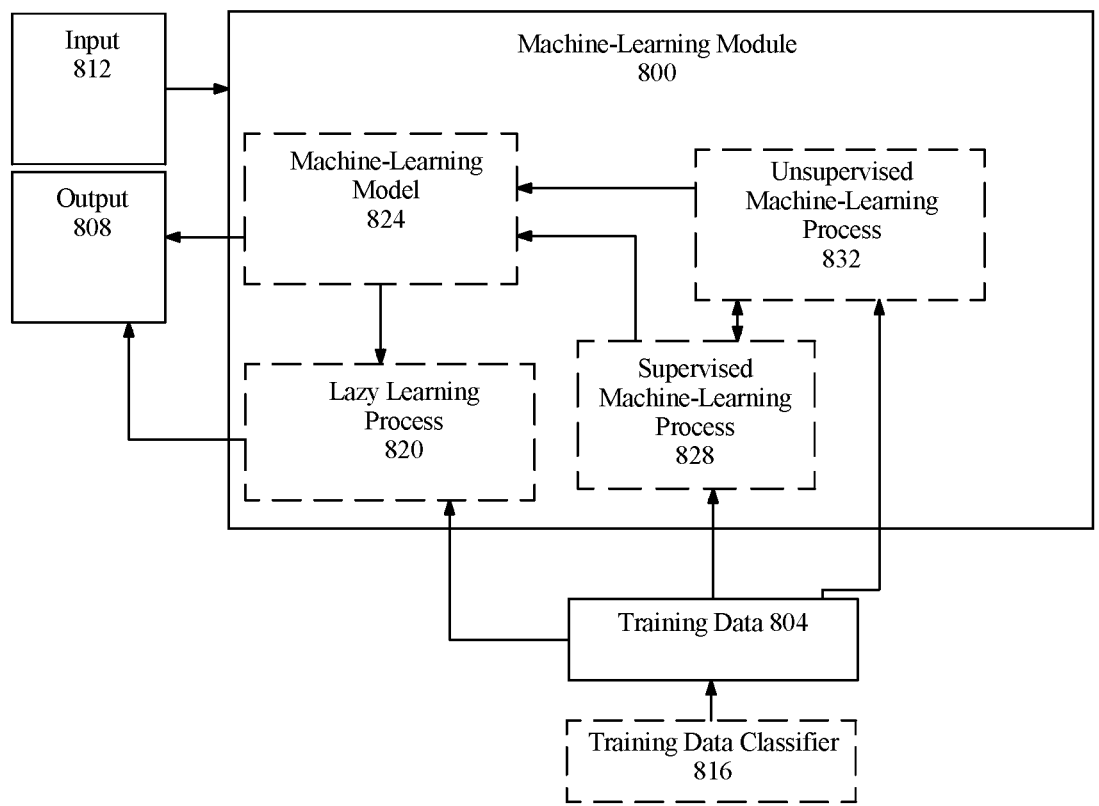
FIG. 8 is a block diagram of an exemplary machine-learning process.

Referring now to FIG. 8, an exemplary embodiment of a machine-learning module 800 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 804 to generate an algorithm that will be performed by a computing device/module to produce outputs 808 given data provided as inputs 812; this is in contrast to a non-machine learning software program where the commands to be executed are determined in advance by a user and written in a programming language.

Still referring to FIG. 8, "training data," as used herein, is data containing correlations that a machine-learning process may use to model relationships between two or more categories of data elements. For instance, and without limitation, training data 804 may include a plurality of data entries, each entry representing a set of data elements that were recorded, received, and/or generated together; data elements may be correlated by shared existence in a given data entry, by proximity in a given data entry, or the like. Multiple data entries in training data 804 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 804 according to various correlations; correlations may indicate causative and/or predictive links between categories of data elements, which may be modeled as relationships such as mathematical relationships by machine-learning processes as described in further detail below. Training data 804 may be formatted and/or organized by categories of data elements, for instance by associating data elements with one or more descriptors corresponding to categories of data elements. As a non-limiting example, training data 804 may include data entered in standardized forms by persons or processes, such that entry of a given data element in a given field in a form may be mapped to one or more descriptors of categories. Elements in training data 804 may be linked to descriptors of categories by tags, tokens, or other data elements; for instance, and without limitation, training data 804 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 8, training data 804 may include one or more elements that are not categorized; that is, training data 804 may not be formatted or contain descriptors for some elements of data. Machine-learning algorithms and/or other processes may sort training data 804 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 804 to be made applicable for two or more distinct machine-learning algorithms as described in further detail below. Training data 804 used by machine-learning module 800 may correlate any input data as described in this disclosure to any output data as described in this disclosure. As a non-limiting illustrative example, a flight component datum and/or flight phase datum may be inputs for a flight component discrepancy datum and/or a flight phase discrepancy datum outputs, respectively.

Further referring to FIG. 8, training data may be filtered, sorted, and/or selected using one or more supervised and/or unsupervised machine-learning processes and/or models as described in further detail below; such models may include without limitation a training data classifier 816. Training data classifier 816 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 800 may generate a classifier using a classification algorithm, defined as a processes whereby a computing device and/or any module and/or component operating thereon derives a classifier from training data 804. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 816 may classify elements of training data to levels of severity of a discrepancy in flight parameters for which a subset of training data may be selected.

Still referring to FIG. 8, machine-learning module 800 may be configured to perform a lazy-learning process 820 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 804. Heuristic may include selecting some number of highest-ranking associations and/or training data 804 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 8, machine-learning processes as described in this disclosure may be used to generate machine-learning models 824. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 824 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 824 may be generated by creating an artificial neural network, such as a convolutional neural network comprising an input layer of nodes, one or more intermediate layers, and an output layer of nodes. Connections between nodes may be created via the process of "training" the network, in which elements from a training data 804 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, machine-learning algorithms may include at least a supervised machine-learning process 828. At least a supervised machine-learning process 828, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include as described above as inputs, any outputs described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 804. Persons skilled in the art, upon reviewing the entirety of this disclosure, will be aware of various possible variations of at least a supervised machine-learning process 828 that may be used to determine relation between inputs and outputs. Supervised machine-learning processes may include classification algorithms as defined above.

Further referring to FIG. 8, machine learning processes may include at least an unsupervised machine-learning processes 832. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 8, machine-learning module 800 may be designed and configured to create a machine-learning model 824 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 8, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods.

Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
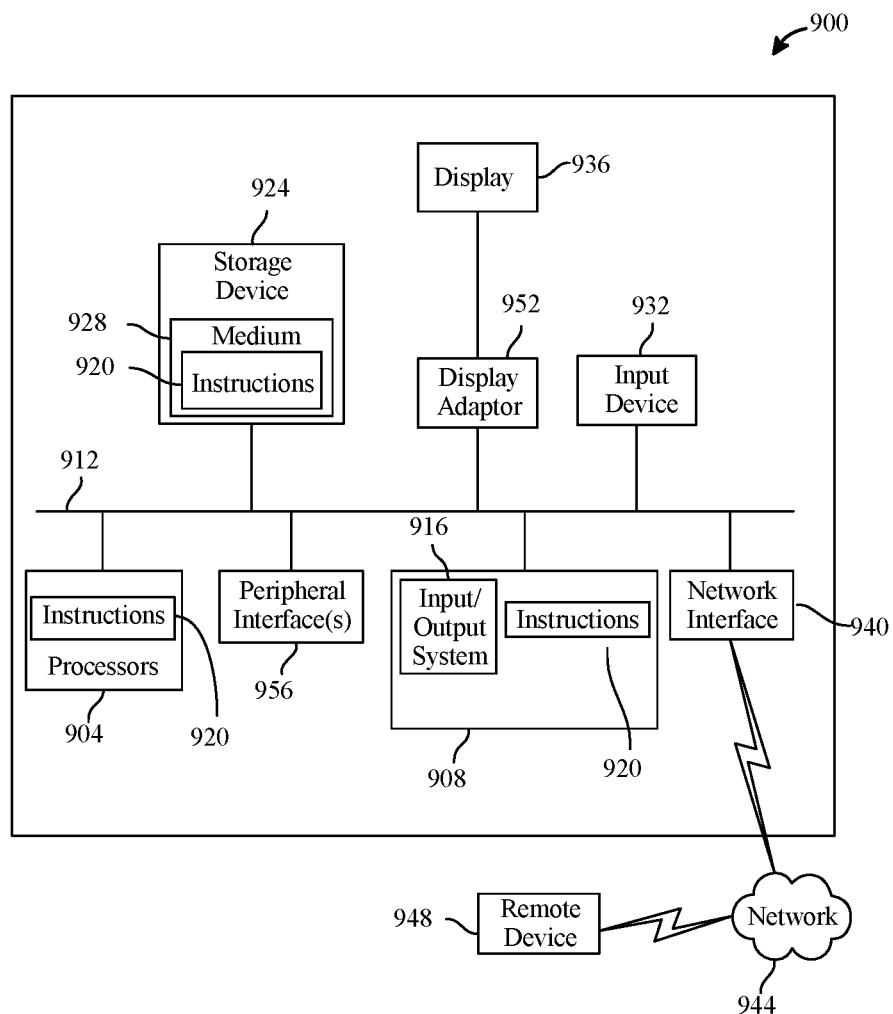
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for determining areas of discrepancy in flight for an electric aircraft, the system comprising:
    a plurality of sensors, wherein each sensor is communicatively connected to a flight component of an electric aircraft and configured to:
        detect a measured flight datum; and
        generate a flight phase datum as a function of the measured flight datum; and
    a computing device communicatively connected to the plurality of sensors, the computing device configured to:
        determine, using a flight phase machine-learning model and the flight phase datum, a flight phase discrepancy datum;
        identify an anomalous performance phase as a function of the flight phase discrepancy datum; and
        generate an anomaly response as a function of an anomalous source wherein the anomalous source is identified as a function of a comparison of the flight phase discrepancy datum and a flight phase history datum retrieved from an aircraft datum database and the anomaly response comprises:
            at least a maintenance report; and
            at least a corrective action, wherein the at least a corrective action comprises:
                an aerodynamic drag induction, the aerodynamic drag induction comprising recuperating aerodynamic energy; and
            at least a strike force command.

2. The system of claim 1, wherein the plurality of sensors comprises:
    a first sensor configured to detect a first measured flight datum of the flight component at a first time interval; and
    a second sensor configured to detect a second measured flight datum of the flight component at a second time interval.

3. The system of claim 2, wherein the computing device is further configured to determine the flight phase discrepancy datum as a function of the first measured flight datum and the second measured flight datum.

4. The system of claim 1, wherein the sensor is further configured to generate a flight component datum as a function of the measured flight datum.

5. The system of claim 4, wherein the computing device is further configured to:
    determine a flight component discrepancy datum as a function of the flight component datum;
    identify an anomalous performance flight component as a function of the flight component discrepancy datum; and
    generate the anomaly response as a function of the anomalous performance flight component.

6. The system of claim 1, wherein the computing device is further configured to generate the anomaly response during flight.

7. A method for determining areas of discrepancy in flight for an electric aircraft, the method comprising:
- detecting, by a sensor communicatively connected to a flight component of an electric aircraft, a measured flight datum;
- generating a flight phase datum as a function of the measured flight datum;
- determining, by a computing device communicatively connected to the sensor, a flight phase discrepancy datum;
- identifying an anomalous performance phase as a function of the flight phase discrepancy datum; and
- generating an anomaly response as a function of an anomalous source wherein the anomalous source is identified as a function of a comparison of the flight phase discrepancy datum and a flight phase history datum retrieved from an aircraft datum database and the anomaly response comprises:
- at least a maintenance report; and
- at least a corrective action, wherein the at least a corrective action comprises:
  - an aerodynamic drag induction, the aerodynamic drag induction comprising recuperating aerodynamic energy; and
  - at least a strike force command.

8. The method of claim 7, wherein the method further comprises:
- detecting, by a first sensor communicatively connected to the flight component, a first measured flight datum at a first time interval; and
- detecting, by a second sensor communicatively connected to the flight component, a second measured flight datum at a second time interval.

9. The method of claim 8, wherein the method further comprises determining the discrepancy datum as a function of the first measured flight datum and the second measured flight datum.

10. The method of claim 7, wherein the method further comprises generating a flight component datum as a function of the measured flight datum.

11. The method of claim 10, wherein the method further comprises:
- determining, by the computing device, a flight component discrepancy datum as a function of the flight component datum;
- identifying an anomalous performance flight component as a function of the flight component discrepancy datum; and
- generating the anomaly response as a function of the anomalous performance flight component.

12. The method of claim 7, wherein the method further comprises generating the anomaly response during flight.

* * * * *